United States Patent Office 3,030,269
Patented Apr. 17, 1962

3,030,269
PHENYLARSONIC ACID COMPOSITIONS
Richard B. Hasbrouck, Lake Forest, and Arthur Alter, Waukegan, Ill., assignors to Abbott Laboratories, North Chicago, Ill., a corporation of Illinois
No Drawing. Filed Feb. 18, 1960, Ser. No. 9,447
15 Claims. (Cl. 167—53.1)

This invention relates to animal husbandry and is particularly concerned with a method and composition for the control of gastro-intestinal parasites.

Domestic animals are subject to attack by a number of different gastro-intestinal parasites. Certain of these parasites are minute protozoan organisms known as coccidia. These protozoan organisms are the causative agents of coccidiosis, which is a particularly prevalent and destructive disease of fowl such as chickens and turkeys. The disease is also found in ducks, geese, pigs, lambs, calves, and other domesticated animals.

The coccidia invade and multiply in various organs but particularly in the alimentary or digestive tract of their host. During the process of growth and multiplication, they erode the epithelial tissue of the cecum and intestine bringing about anemia, weakness, serious digestive disturbances, intestinal hemorrhage and intestinal necrosis. Animals which do not succumb to the infection are often rendered economically unfit by the irreparable damage from the disease.

Numerous remedies have been suggested and made available for the control of parasitic diseases of the gastro-intestinal tract of animals. Their administration often has been through the water or feed for the animals. Many of these materials are ineffective while others are too expensive or too toxic for prophylactic administration. One of the difficulties encountered in such administration has been the adverse effect which certain of the materials have upon the animals in retarding growth. Another difficulty has been the poisoning of the blood-forming organs and a subsequent reduction in the number of red and white blood cells throughout the body. These effects have made the use of many remedies hazardous and unprofitable. The need for inexpensive prophylactic methods for the suppression of coccidial infection is well recognized, as this disease constitutes one of the major problems confronting the poultry industry.

It is an object of the present invention to provide a new and improved practice for raising domesticated animals or fowl. A further object is to provide a new method for the control of parasitic diseases of the gastro-intestinal tract of animals. Another object is to provide a method for the control of gastro-intestinal parasites in animals. An additional object is the provision of a novel method for the control of coccidiosis. A still further object is the provision of a method which may be employed prophylactically without adversely affecting the metabolic activity of the animal. Still another object is the provision of novel feed compositions to be employed in the new practice for raising animals. Other objects will become apparent from time to time throughout the following specification and appended claims.

The new practice of benefiting animals comprises feeding the animals a compound of the formula:

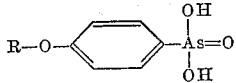

wherein R is a straight or branched alkyl group containing from one to eight carbon atoms inclusive, allyl, benzyl, phenylethyl, phenylpropyl or phenoxyethyl to protect the treated animals from parasitic diseases of the gastro-intestinal tract and particularly to protect them from coccidiosis. The substituted phenylarsonic acid compounds are crystalline solids and inexpensive to prepare. They are not repellent to animals and may be employed in admixture with the feed. They may be administered continuously or intermittently in dosages sufficient to control gastro-intestinal parasites without adversely affecting the metabolic activity or imparting any unpalatable characteristics to the flesh of the animals.

The oral administration or feeding of an effective dosage of the substituted phenylarsonic acid compounds is essential for the practice of the present invention. In general, good results are obtained when the animals are fed daily dosages of from 1.8 to 18 mg. of the substituted phenylarsonic acid compound per kilogram of body weight. Where danger of reinfection from contaminated feed or surroundings is low, good controls are obtained when the animals are fed daily dosages of 1.8 to 10 mg. or more per kilogram of body weight for a period of from two to five days.

The method of the present invention may be carried out by orally administering or feeding the unmodified substituted phenylarsonic acid compounds. However, the present method also embraces the employment of a liquid, powder, mash or other animal feed composition containing the substituted phenylarsonic acid compounds. In such usage, the compounds may be modified with one or more of a plurality of innocuous ingestible vehicles including water, skim milk, alcohol, syrups, edible oils or other liquid carriers; dispersing or emulsifying agents and solid carriers such as edible powders and commercial animal feeds, concentrates or supplements. Such augmented compositions are adapted to be fed animals to supply the desired dosages of active agent or to be employed as concentrates and subsequently diluted with additional carriers to produce the ultimate compositions.

The exact concentration of the substituted phenylarsonic acid compounds to be employed in the compositions may vary provided sufficient of the composition is ingested by the animal in order to provide the required dosage of active agent. For example, where individual administration is preferred, liquid or solid compositions containing from 1 to 95% by weight may be employed to supply the desired dosage. Where the compounds are provided as a constituent of the sole food ration, satisfactory results are obtained with food rations containing a minor but effective amount of the substituted phenylarsonic acid compounds. The exact amount of the compounds in the ration is dependent on the total dietary food habits of the animal concerned. In fowl, the required dosages may be supplied with mash compositions containing from 0.001 to 0.01% by weight of the active agents. Where the compounds are furnished in the drinking water, good results are obtained at concentrations of the agents in the water equal to one-half those employed when the compounds are supplied as a constituent in the sole food ration. In compositions to be employed as concentrates, the active agents may be present in a concentration of from 1 to 95% by weight.

Liquid compositions containing the desired amount of the substituted phenylarsonic acid compounds may be prepared by dissolving the compounds or alkali metal salts thereof in alcohol or an edible oil, or by dispersing them in water with the aid of a suitable surface active dispersing agent such as an ionic or non-ionic emulsifying agent. Suitable surface active dispersing agents include the glycerol and sorbitan esters of fatty acids and the polyoxyalkylene derivatives of fatty alcohols and of sorbitan esters. The aqueous compositions may contain one or more water-immiscible oils as a solvent for the active ingredient. In such compositions the water, oil and emulsifying agent constitute an aqueous emulsion carrier. If desired, the alkali metal salts of the active compounds may be dissolved in water directly.

In the preparation of solid feed compositions, the substituted phenylarsonic acid compounds may be mechanically ground with an edible solid such as aluminum magnesium silicate. This composition may be fed in the form of capsules or tablets or dispersed in an animal feed and such feed used to supply a part of the entire ration. Alternatively, the substituted phenylarsonic acid compounds may be dissolved in an organic solvent such as alcohol, the resulting solution dispersed in an animal feed and the feed dried to remove the solvent. If desired, the compounds may be dissolved or suspended in an edible oil such as coconut oil, cottonseed oil or peanut oil, and the resulting solutions or suspensions dispersed in the feed. These solid and edible oil compositions may contain one of the aforementioned emulsifying materials as a dispersing agent.

In the illustrated embodiments which follow, the procedure for testing the anticoccidial properties of the various substituted phenylarsonic acids employed herein was as follows: *Eimeria tenella* which is the most pathogenic of all the known poultry coccidia and the cause of caecal coccidiosis was the test organism employed. Prevention of coccidiosis was measured in the reduced death rate from coccidiosis while the chicks were treated by the drug-diet method. Chicks were placed on the specific medicated diets for 24 hours before the infection and continued on the diet and under observation for eight days after medication began.

The feed used was a commercial chick starter without any medication. At the beginning of each experiment a sufficient amount of this feed (1.5 kg.) was medicated with a specific substituted phenylarsonic acid for the entire experimental period. In preparation for blending into the feed, the substituted phenylarsonic acid was ground into a fine powder with a mortar and pestle and the specified amount weighed out on an analytical balance. When the substituted phenylarsonic acid was used at a concentration of 0.01% in the diet, the compound was added to half of the feed in a twin shell, stainless steel blender, the remaining half of the feed added and the blender operated for 20 minutes. When lower concentrations of the substituted phenylarsonic acids were used a specified amount was thoroughly shaken in 10 grams of soybean meal and the resulting premix added as described above and the blender operated for 30 minutes.

Five to 15 barred rock chicks were used to assay each compound and in each test two such pens of chicks were maintained on the unmedicated diet as controls. All chicks were infected with enough coccidia to produce on the average at least 50% mortality in eight days among the unmedicated controls. Thus, each chick received 500,000 sporulated oöcysts directly into the crop 24 hours after the test birds were placed on the medicated diets. All birds continued on the specified diet for 8 days after infection and the deaths in each pen recorded daily. The results of the tests are shown in the following tables.

TABLE I

*Substituted phenylarsonic acids which prevented caecal coccidiosis in chickens when incorporated in the medicated feed at a concentration of 0.01% in contrast to the deaths among the unmedicated controls*

| Compounds | Medicated Birds | | Unmedicated Controls | |
|---|---|---|---|---|
| | No. of Birds | No. of Deaths | No. of Birds | No. of Deaths |
| p-Methoxyphenylarsonic acid | 15 | 1 | 27 | 13 |
| p-Allyloxyphenylarsonic acid | 10 | 1 | 20 | 5 |
| p-n-Butoxyphenylarsonic acid | 10 | 0 | 20 | 14 |
| p-sec.-Butoxyphenylarsonic acid | 9 | 0 | 20 | 5 |
| p-n-Amoxyphenylarsonic acid | 9 | 0 | 17 | 11 |
| p-n-Heptyloxyphenylarsonic acid | 10 | 2 | 20 | 14 |
| p-n-Octyloxyphenylarsonic acid | 11 | 0 | 19 | 5 |
| p-β-Phenylethoxyphenylarsonic acid | 10 | 0 | 17 | 11 |
| p-β-Phenoxyethoxyphenylarsonic acid | 10 | 1 | 20 | 14 |

In contrast to the results shown in the above table, p-hydroxyphenylarsonic acid at a concentration of 0.01% in the diet resulted in the death from coccidiosis of six out of twelve chicks in a test run in which 14 of 26 unmedicated controls died of coccidiosis.

TABLE II

*Substituted phenylarsonic acids which prevented caecal coccidiosis in chickens when incorporated in the medicated feed at a concentration of 0.005% by weight in contrast to the deaths among the unmedicated controls*

| Compounds | Medicated Birds | | Unmedicated Controls | |
|---|---|---|---|---|
| | No. of Birds | No. of Deaths | No. of Birds | No. of Deaths |
| p-Ethoxyphenlarsonic acid | 5 | 1 | 18 | 11 |
| p-n-Propoxyphenlarsonic acid [1] | 9 | 0 | 19 | 14 |
| p-Isopropoxyphenylarsonic acid | 6 | 0 | 18 | 11 |
| p-Isobutoxyphenylarsonic acid | 7 | 1 | 18 | 11 |
| p-Isoamoxyphenlarsonic acid | 10 | 0 | 18 | 11 |
| p-l-Methylbutoxyphenylarsonic acid | 10 | 0 | 18 | 11 |
| p-n-Hexoxyphenylarsonic acid | 10 | 0 | 18 | 11 |
| p-2-Ethylbutoxyphenylarsonic acid | 10 | 0 | 18 | 11 |
| p-Benzyloxyphenylarsonic acid | 14 | 0 | 30 | 15 |
| p-α-Phenylpropoxyphenylarsonic acid | 9 | 0 | 18 | 11 |

[1] The results on this compound were obtained from feeding at 0.002% by weight in the diet.

In another embodiment, 90 parts by weight of p-allyloxyphenylarsonic acid is mechanically ground with 10 parts of bentonite to produce a medicated feed composition.

In a similar manner, a medicated feed composition is prepared by grinding together 50 parts by weight of p-n-propoxyphenylarsonic acid, one part of sorbitan monopalmitate, and 49 parts of corn starch.

In another operation, 10 parts by weight of p-benzyloxyphenylarsonic acid is dispersed in 90 parts of peanut oil to prepare a composition in the form of an edible liquid.

In a further operation, 20 parts by weight of p-n-octyloxyphenylarsonic acid is mechanically mixed with 80 parts of soybean meal to prepare a medicated animal feed.

These compositions are adapted to be fed to animals to supply the desired dosage of substituted phenylarsonic acid compound or to be employed as concentrates and subsequently diluted with additional edible carriers to produce animal feeds containing the desired amount of active agent.

The substituted phenylarsonic acid compounds as employed in accordance with the present invention may be prepared by reacting p-hydroxyphenylarsonic acid with the appropriate alkyl halide. The reaction is carried out in the presence of potassium hydroxide. Good results are obtained when employing one molecular proportion of each reactant with about three molecular proportions of the hydroxide. The reaction conveniently can be carried out in a solvent such as a mixture of ethyleneglycol monomethylether and water.

In carrying out the reaction, the p-hydroxyphenylarsonic acid, alkyl halide, hydroxide, water and glycol ether, if employed, are mixed together and the resulting mixture heated at the reflux temperature for a sufficient period of time (generally from 40 to 60 hours) to complete the reaction. The reaction product is thereafter isolated by concentrating the solution to dryness, dissolving the residue in water and precipitating the desired product with mineral acid such as hydrochloric acid. The solid product is then filtered, washed with water, dried and recrystallized from a suitable solvent such as a mixture of water and ethanol.

What is claimed is:
1. A method which comprises feeding an animal a com- position comprising as an active ingredient a substituted phenylarsonic acid of the formula:

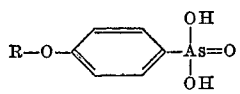

wherein R represents a member of the group consisting of straight and branched chain alkyl radicals containing from one to eight carbon atoms inclusive, allyl, benzyl, phenylethyl, phenylpropyl and phenoxyethyl in intimate admixture with an innocuous ingestible vehicle, the composition being fed in an amount sufficient to provide a daily dosage of from 1.8 to 18 mg. of the acid compound per kilogram of body weight.

2. In the practice of animal husbandry, the method which comprises feeding animals a substituted phenylarsonic acid compound of the formula:

wherein R represents a member of the group consisting of straight and branched chain alkyl radicals containing from one to eight carbon atoms inclusive, allyl, benzyl, phenylethyl, phenylpropyl and phenoxyethyl, the substituted phenylarsonic acid being fed at a daily dosage of from 1.8 to 18 mg. per kilogram of body weight.

3. A method as claimed in claim 2 wherein the substituted phenylarsonic acid compound is p-n-propoxyphenylarsonic acid.

4. A method as claimed in claim 2 wherein the substituted phenylarsonic acid is p-n-butoxyphenylarsonic acid.

5. A method as claimed in claim 2 wherein the substituted phenylarsonic acid is p-benzyloxyphenylarsonic acid.

6. A method as claimed in claim 2 wherein the substituted phenylarsonic acid is p-isoamoxyphenylarsonic acid.

7. A method as claimed in claim 2 wherein the substituted pheylarsonic acid is p-sec.-butoxyphenylarsonic acid.

8. A concentrate composition comprising from 1 to 95% by weight of a substituted phenylarsonic acid of the formula:

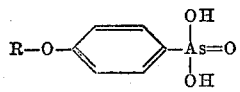

wherein R represents a member of the group consisting of straight and branched chain alkyl radicals containing from one to eight carbon atoms inclusive, allyl, benzyl, phenylethyl, phenylpropyl and phenoxyethyl in intimate admixture with an edible, finely divided solid.

9. An animal feed containing from 0.001 to 0.01% by weight of a substituted phenylarsonic acid of the formula:

wherein R represents a member of the group consisting of straight and branched chain alkyl radicals containing from one to eight carbon atoms inclusive, allyl, benzyl, phenylethyl, phenylpropyl and phenoxyethyl.

10. A poultry feed containing from 0.001 to 0.01% by weight of p-n-propoxyphenylarsonic acid.

11. A poultry feed containing from 0.001 to 0.01% by weight of p-benzyloxyphenylarsonic acid.

12. A poultry feed containing from 0.001 to 0.01% by weight of p-n-hexoxyphenylarsonic acid.

13. A poultry feed containing from 0.001 to 0.01% by weight of p-n-butoxyphenylarsonic acid.

14. A poultry feed containing from 0.001 to 0.01% by weight of p-isoamoxyphenylarsonic acid.

15. A poultry feed containing from 0.001 to 0.01% by weight of p-allyloxyphenylarsonic acid.

References Cited in the file of this patent

UNITED STATES PATENTS 2,088,608    Raiziss et al.    Aug. 3, 1937
2,476,890    Morehouse    July 19, 1949

OTHER REFERENCES

Balaban: C.A. 26, 1932, 111(3).
Marathe: C.A. 48, 1954, 5135(f).